Jan. 17, 1961     E. SHAPIRO ET AL     2,968,721

METHODS OF FLOW RATE MEASUREMENT

Original Filed Sept. 27, 1954

JEROME KOHL
RICHARD L. NEWACHECK
EDWARD SHAPIRO
              *INVENTORS*

BY *Spencer E. Olson*
          *ATTORNEY*

United States Patent Office 2,968,721
Patented Jan. 17, 1961

2,968,721

METHODS OF FLOW RATE MEASUREMENT

Edward Shapiro, Newton Highlands, Mass., and Jerome Kohl, Berkeley, and Richard L. Newacheck, Concord, Calif., assignors to Tracerlab, Inc., Boston, Mass., a corporation of Massachusetts Original application Sept. 27, 1954, Ser. No. 458,574. Divided and this application July 12, 1955, Ser. No. 521,468

3 Claims. (Cl. 250—43.5)

This invention relates to a method and apparatus for measuring the rate of flow of a fluid material through a pipe, conduit, or other transmitting means and is a division of our copending application Serial No. 458,574, filed September 27, 1954. More particularly, the invention relates to unique methods of storing and injecting radioactive tracer materials into a process line to measure the rate of flow of material in the process line.

In the catalytic cracking process, catalyst circulation rate is one of the critical process variables, and knowledge of this rate at all times is necessary in order to maintain operation at optimum conditions. Originally, this operating value was measured by wattmeters or torquemeters in the plants using elevators for catalyst circulation and by correlation of vapor-lift gas rates and pressure drop in the plants using gas lift for circulating catalyst. These methods are relatively inaccurate and unreliable, and in the case of gas lift plants, the determination of catalyst circulation rate from gas lift conditions is so involved and time-consuming that it is useful only during special test periods and is of little value for routine control.

A radioactive-tracer method has been developed for determining rate of catalyst flow in Thermofor and Houdriflow catalytic crackers, the features of which are described in some detail in the March 23, 1953, edition of The Oil and Gas Journal. In these processes, the catalyst is in the form of beads, and the method involves the incorporation of radioactivity in a few of the beads, and the measurement of the time interval required for the passage of a radioactive bead between two points such that the intervening weight of catalyst is accurately defined.

This method has proved to be very reliable and useful in catalytic crackers wherein the catalyst is in the form of beads, but cannot be practiced in fluid catalytic crackers where the catalyst consists of very finely divided particles, which conventionally have an average size of about 60 microns. For the radioactive-tracer methods to be effective, the radioactivated particles must have the same chemical and physical characteristics as the catalyst in order that they be carried along at the same rate. With particles of a size of 60 microns, however, it is impossible to incorporate enough radioactivity into the individual particles so that it can be detected through the walls of the conduit using available radiation detectors.

It is an object of the present invention, therefore, to provide a method for determining the rate of flow of fluid catalyst in a fluid catalytic cracker.

Another object of the invention is to provide a method for determining the rate of flow of a fluid in a pipe or conduit.

Another object of the invention is to provide a radioactive-tracer method for measuring flow rate in a circulatory system whereby successive injections of radioactive material are not confused at the points of detection.

In accordance with the invention, radioactivity is injected into a process line, for example, at a predetermined point in the catalyst circulating system of a fluid catalytic cracker, and the time it takes to reach a detection position downstream from the point of injection, or the time of passage between two detectors located a predetermined distance apart along the line, is determined. In order to avoid a build-up of radioactivity in the cracker, an isotope of relatively short-life compared to the time for completing a cycle is used. Radioisotopes of the requisite short half-life being difficult to store for convenient periods without having a prohibitively large initial amount, the present invention contemplates the storage of a long-lived parent isotope on an ion exchange column from which a short-lived daughter is readily eluted. More particularly, the invention contemplates the use of the Cs–137—Ba–137 pair, since the parent Cs–137 has a half-life of 33 years, and can thus be stored for long periods without appreciable diminution of activity, and the daughter, Ba–137, having a conveniently measured .66 mev. gamma ray and a half-life of 2.6 minutes, is injected into the process line. This half-life is sufficiently short, that in most recycling apparatus which one might expect to encounter, the activity decays to an essentially unmeasurable value before arriving a second time at the detection station.

Further objects and features of the invention will become apparent from the following detailed description of a preferred embodiment when considered with the accompanying drawings in which.

Figure 1:
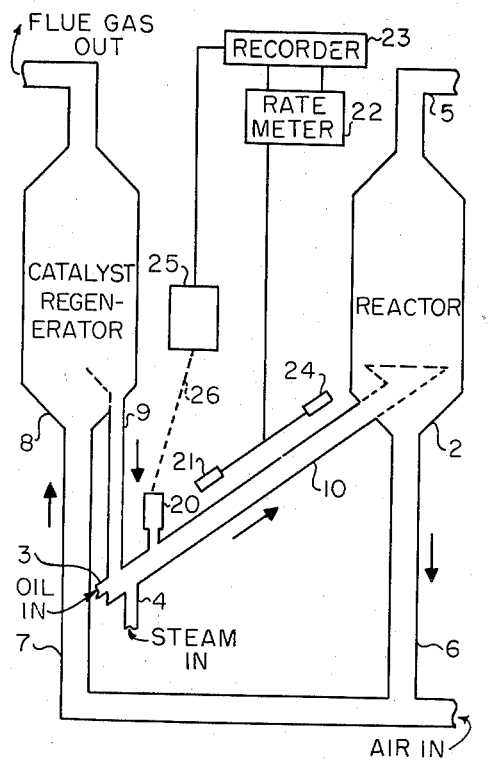
Fig. 1 is a diagrammatic view of fluid catalytic cracker apparatus and shows the way in which the rate of flow of catalyst is determined.

Referring to Fig. 1, fluid catalytic cracking apparatus generally comprises a reactor 2 into which the oil undergoing reaction is fed through line 3, the cracked oil vapors being withdrawn through line 5 for further processing in the recovery and fractionating section. The reaction takes place in the presence of a fluid catalyst, consisting of finely divided particles, which is continuously circulated through the system. The spent catalyst is discharged from reactor 2 by gravity through standpipe 6, whereupon it is carried by air through the regenerator riser 7 into regenerator 8 where the catalyst is reactivated. Upon leaving chamber 8, the regenerated catalyst, which exhibits properties very similar to liquids, flows through standpipe 9 at the base of which it is mixed with the oil to be cracked and carried into the reactor 2 through reactor riser 10 under the influence of steam or gas introduced at line 4. The recycle time of the catalyst varies with the size of the plant, the air and steam pressures used, etc., 15 to 20 minutes being illustrative. The cracking apparatus is a closed system, and conditions are established to cause the catalyst to circulate at substantially the same rate throughout the system, permitting determination of circulation rate at any convenient point. It is possible to measure catalyst circulation rate in either of four locations, in standpipe 6, riser 7, standpipe 9 or reactor riser 10, the choice in any particular installation depending in large part on the accessibility of the location. For purposes of illustration, an installation of measuring apparatus on reactor riser 10 will now be described.

In accordance with the invention, a radioactive fluid is injected into the catalyst line, the rather long unobstructed reactor riser 10 being a convenient location for the injection. An injector 20 is positioned near the lower end of riser 10, and is arranged to be remotely operated periodically to inject radioactive material into the pipe 10. Spaced from the point of injection in the direction of flow is a first radiation counter 21 (preferably a plurality of counters distributed around the outside of pipe 10 and connected in parallel for reliability) which detects the radiation from the radioactive fluid as it is carried through the pipe by the fluid catalyst. The output of counter 21 is coupled to a count ratemeter 22, the output of which may be coupled to a strip chart recorder 23, the latter two instruments preferably being located in the control room of the cracking apparatus. An increase in counting rate from detector 21, manifested by a peak on the trace on the recorder chart, indicates the passage of the radioactive material past the detector and serves as zero time from which rate of movement may be measured. Downstream from detector 21, and spaced therefrom the length of riser 10, of the order of 50 feet, is mounted a second detector 24 (again preferably a plurality of counters connected in parallel) the output of which is coupled to count ratemeter 22. As the radioactive material passes detector 24, the counting rate again increases and provides a second peak on the recorder chart. The time interval between the two peaks is a measure of the time it takes the catalyst to travel a fixed distance. Since this part of the system has accurately known dimensions, and since the density of the catalyst in the line can be determined, it is a simple matter to calculate the weight of catalyst that occupies the space between the two detectors. Knowing the weight and the time interval between the responses of detectors 21 and 24, the circulation rate in tons per hour can be calculated directly.

An alternate arrangement for indicating the rate of flow may consist of a circuit 25 arranged to supply an electrical impulse to recorder 23 in response to the closure of a switch (indicated by dotted line 26) at the time of injection of the radioactive tracer by injector 20. The switch is arranged to be closed by the activation of the injector whereby the time interval between the impulse from circuit 25 and the pulse indicative of the radioactivity passing detector 24 is representative of the rate of flow.

For continuous determination of rate of flow of catalyst, the radioactive material may be routinely injected at regular intervals, say every 30 minutes, or spot determinations may be made when other conditions indicate that the flow rate may not be optimum. Inasmuch as a considerable amount of activity must be injected to permit detection through the walls of conduit 10, it will be apparent that unless the activity is appreciably reduced during circulation, there will be a buildup of activity in the cracker and interference with the measurement of rate of flow of subsequent injections. In order to overcome this difficulty, an isotope having a half-life considerably shorter than the cycling time is used such that the isotope decays to an undetectable amount by the time it has passed through the cracker apparatus and is returned to the detection region. While a rapidly-decaying isotope is advantageous from this standpoint, it has the obvious disadvantage that sufficient quantities of the isotope cannot conveniently be stored. This difficulty is overcome through the utilization of a reservoir of a long-lived parent isotope from which a short-lived daughter can periodically be "milked." Five parent-daughter pairs are known (to be listed later) which might be employed, the best of which for purposes of the present application is the pair Cs—Ba-137, the parent Cs-137 having a half-life of 33 years and the daughter Ba-137 having a half-life of 2.6 minutes. Ba-137 emits a 0.66 mev. gamma ray which is conveniently measured through the wall of conduit 10.

Figure 2:
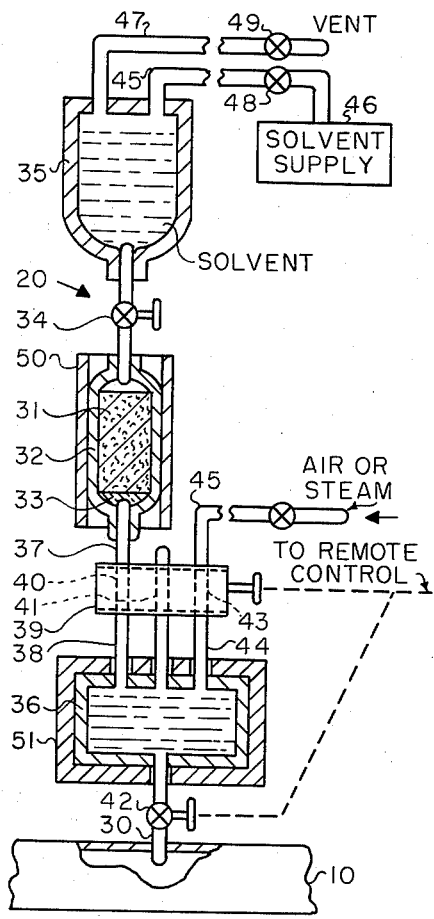
Fig. 2 is a diagrammatic view, partially in section, illustrating the details of one form of the injection apparatus.

Having described a typical installation in which a radioactive material of short half-life is necessary to determine flow rate by the tracer method, apparatus for storing the radioactive material and obtaining injection "shots" of the short-lived isotope will now be described with reference to Fig. 2. The injector generally designated by numeral 20 is preferably positioned vertically to take advantage of gravity for the flow of liquid therethrough, and has a discharge tube 30 inserted through the wall of conduit 10 (Fig. 1). The heart of the injection apparatus is a reservoir of radioactive cesium–137 which consists of a column of ion exchange resin 31 enclosed by a suitable vessel 32, the lower end of which is closed by a porous glass filter 33 to prevent discharge of the resin. The resin-column 31 may be any available strongly acidic cation exchange resin such as sulphonated polystyrene, cross-linked with divinyl benzene (DVB) to varying degrees depending on the properties desired. Resins having the requisite properties are available from the Dow Chemical Company as "Dowex–50," and from Rohm and Haas, Philadelphia, as "Amberlite–IR–120." In the preparation of the reservoir, a solution of radioactive cesium-137 is passed through the resin bed 31, the cesium being adsorbed on the resin particles. Cesium–137 is unstable, having a half-life of 33 years, decaying to an excited state of barium–137, which in turn has a half-life of 2.6 minutes and decays to stable barium with the emission of a gamma ray of an energy of 0.66 mev. If the column is undisturbed for a period equal to six or seven half-lives of the Ba–137, the Cs–137 and Ba–137 are in secular equilibrium on the resin, the cesium, however, being more closely bonded to the resin than the barium.

Positioned above the column 32 and communicating therewith through normally open valve 34 is a vessel 35 of suitable material, e.g., glass or metal, containing an alkaline solvent for eluting the Ba–137 from the resin column. For example, the solvent may be an alkaline complexing agent, such as a .01 molar solution of "Versene," the tetra sodium salt of ethylene diamine tetra acetic acid, available from the Bersworth Chemical Company, Framingham, Massachusetts. A pH of about pH–10.3 is particularly satisfactory. The "Versene" complexes more readily with barium than it does with cesium, with the result that as the solvent is passed through the resin, substantially all of the then present Ba–137 is removed from the column, leaving the cesium adsorbed on the resin. The general equations which illustrate the mechanics of the separation are as follows:

(1) $\quad 2BaR_2 + Na_4V \rightarrow Ba_2V + 4NaR$ (2) $\quad 4CsR + Na_4V \leftarrow Cs_4V + 4NaR$ where R represents "resin," and V represents "Versene."

The barium having a greater affinity for the "Versene" while the cesium has a greater tendency to be retained by the resin, the barium is effectively removed from the resin by the "Versene" solution passing therethrough.

The lower end of vessel 33 communicates with a small chamber 36 through conduits 37 and 38 and three-port valve 39, the port 40 being open in one position of the valve to permit Ba-137-carrying solvent to flow into and fill chamber 36, the port 41 at the same time being open to vent the chamber to the atmosphere. Discharge tube 30 is coupled to chamber 36 through a quick-opening valve 42 which is closed except when an injection is being made.

The third port 43 of valve 39 (closed when ports 40 and 41 are open, and vice versa) is connected through line 44 to chamber 36 and through line 45 to a supply of high pressure steam or air, preferably located remotely from the injector. In a third position of the valve, the normal position between injections, all of ports 40, 41 and 43 are closed. When an injection is to be made, valve 39 is turned to open ports 40 and 41 to allow solvent to flow through the exchange column to elute Ba-137 therefrom and fill chamber 36, which may have a volume of the order of 25 ml. After a period necessary to fill the chamber, valve 42 is quickly opened simultaneously with the opening of port 43

(and closing of ports 40 and 41) of valve 39, whereby pressure is applied to the liquid in chamber 36, rapidly discharging it through discharge tube 30 into conduit 10. After the injection is made, the valve 41 and all of the ports of valve 39 are closed, preferably by control means located in the control room, allowing Ba-137 to again build up on the ion-exchange column 31.

To provide reliable detection of the Ba-137 through the walls and normally encountered lagging of conduit 10 with commercially available Geiger-Mueller counters, each injection should contain about 10 millicuries of Ba-137, it being understood, however, that this figure is illustrative only and in no way limiting. To insure that 10 mc. of Ba-137 are available per injection (assuming a suitable interval between injections) the resin column 31 must have at least 10 mc. of Cs-137 adsorbed thereon, and preferably a little more, since there may not be complete removal of the Ba-137 from the column.

The decay scheme of Cs-137 is such that immediately after removal of the Ba-137 from the column (say 10 mc.), a new supply of Ba-137 is produced, and after about six or seven half-lives of Ba-137 (15-18 min.), there will again be a millicurie quantity of Ba-137 equal to the number of millicuries of cesium-137 on the column, without discernible loss of activity of the cesium. Thus, the cesium-137 provides an essentially unlimited reservoir for Ba-137, which permits "milking" therefrom every 18 minutes or so. Normally it is not necessary to make injections more frequently than once per hour so the "recovery" time of the column is not a problem.

The only material that gets "used" with successive injections is the solvent, and this at the rate of only 25 ml./injection. Assuming one injection per hour, about 50 gallons would be used per year, and since it may not be convenient to mount a vessel 34 of suitable capacity at the injection site, solvent is preferably pumped into the vessel 35 through line 45 from a remote supply 46, the vessel being vented during the filling operation by line 47. The filling and vent valves 48 and 49, respectively, are preferably located in the control room so that solvent may be conveniently added when a remote indicating liquid level gauge on the vessel (not shown) indicates that the level is low. While the system has been described as being gravity-fed, should a particular installation so require, air pressure may be applied to vessel 35 through line 47 to insure proper throughput of solvent.

Since Cs-137 is a pure beta emitter and Ba-137 emits relatively soft gamma rays, the device presents very little radiation hazard, but as protection to personnel during the installation of the injector, the Cs-137—Ba-137 reservoir 31 and the Ba-137 chamber 36 are preferably shielded by lead or other radiation absorbing material, represented at 50 and 51, respectively. Lead shielding of a thickness of 0.5-1.0 inch is entirely adequate.

While the Cs-137—Ba-137 pair has characteristics which are particularly advantageous for the herein-described application, it will be understood that the invention is not limited thereto and that other pairs may be selected from the following group in applications where longer or shorter half-lives of the tracer isotopes are required. The "milking machine" of Fig. 2, using suitable resins and solvents, can be utilized in the manner described for the separation of these parent-daughter combinations.

(1) Ce-144 275 da.→Pr-144 17.5 min.→Nd-144 (stable)
(2) Ba-140 12.5 da.→La-140 40 hr.→Cs-140 (stable)
(3) Ru-106 1 yr.→Rh-106 30 sec.→Pd-106 (stable)
(4) Sr-90 25 yr.→Y-90 2.54 da.→Zr-90 (stable)

Reviewing the operation, with reference to both figures, the injector 20 is mounted at a suitable point in the circulatory system, for example, on reactor riser 10.

Upon opening ports 40 and 41 of valve 39, chamber 36 is allowed to fill up with solvent carrying Ba-137, and thereafter upon opening port 43 of valve 39 and valve 42, the contents of chamber 36, for example 10 mc. of Ba-137 dissolved in 25 ml. of solvent, is injected into the pipe-line. Upon actuation of the valves a switch may be closed to apply an impulse to recorder 23, or as the activity passes detector 21, the increase in counting rate thereof produces a peak on the trace on the recorder from which time may be measured. The radioactive material as it passes the second detector 24 produces a second peak on the recorder trace, the time interval between the peaks being proportional to the rate of movement of catalyst through pipe 10. The half-life of the Ba-137 being only 2.6 minutes, much shorter than the recycling time of 15-20 minutes, it is almost completely decayed to stable barium by the time that portion of the catalyst carrying the activity returns to the detectors thus preventing any build-up of activity in the cracker to confuse the operation of the detectors. The injection equipment 20 provides a substantially unlimited reservoir of Ba-137 from which injections can conveniently be made, by remote control if desired, sufficiently frequently to achieve essentially continuous determination of catalyst flow rate.

Figure 3:
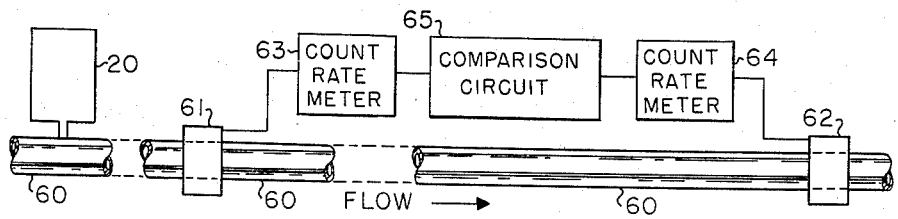
Fig. 3 is a diagrammatic view of a pipe-line illustrating another application of the invention.

Fig. 3 shows another arrangement for measuring rate of flow of a liquid in a pipe or conduit where the use of a short-lived radioactive material finds particular utility and consequently one in which the injector of Fig. 3 is conveniently used. The drawing shows a pipe line 60, through which oil, water or other liquid may flow in the direction indicated. Along the line 60 in the direction of flow are shown in order an injector 20, preferably of the form shown in Fig. 2, and detecting devices 61 and 62 which are sensitve to radioactive emissions emanating from within the line 60.

Injector 20 operates in the manner hereinabove described to inject a discrete quantity of radioactive liquid (e.g. Ba-137 in solution) into the liquid carried by the line 60. The fluid thus supplied has substantially the same physical characteristics and flow properties as the liquid into which it is introduced and accordingly is carried along thereby and has little tendency to spread in the liquid already in the line.

Downstream from the point of injection a distance sufficient to insure substantially uniform flow of the radioactive fluid with the liquid in the line is located detector 61, which is sensitive to gamma radiation passing through the walls of pipe 60. In order to measure the average intensity of the radiations from the discrete volume of radioactive liquid, detector 51 may be of the Geiger-Mueller type of annular form and wrapped around line 60 so as to be sensitive to radiations emanating in all directions. The pulse output of detector 61 is applied to a count ratemeter 63 of suitable design, the output of which is a varying unidirectional signal having an amplitude proportional to the rate of occurrence of pulses applied thereto.

Assuming the use of Ba-137 as the radioactive substance, with a half-life of 2.6 minutes, then, as the material is carried along the line 60 it is continuously undergoing decay to stable barium with the consequence that the intensity of radiations decreases logarithmically with time. That is, 2.6 minutes after the discrete volume of radioactive liquid passes detector 61, the intensity of the radiations will have dropped to one-half the value that was indicated by detector 61 and count rate meter 63, and after an additional 2.6 minutes, the intensity will have dropped to one-fourth of what it was at the time it passed detector 61. Advantage is taken of this known decay rate by locating detector 62, having the same construction and sensitivity as detector 61, downstream from detector 61 a distance such that with a general knowledge of the velocity of flow normally encountered in the line, the radioactive material will have decayed a readily discernible amount when it reaches detector 62. For example, if the velocity of flow is nominally 100 ft./min., and a detector 62 is positioned 260 feet downstream from detector 61, the intensity of radiations indicated by counter 62 and its associated rate meter 64, will be one-half the intensity indicated by detector 61. It will, of course, be understood that the detectors need not be spaced a "half-life" apart, either a smaller or larger spacing being satisfactory, but care must be taken not to space them so far that the radiations are not reliably measurable by detector 62.

It will be readily apparent that the ratio of the outputs of count ratemeters 63 and 64 provides a measure of the time required for the discrete volume of radioactive material to be carried between the two detectors, and the distance being known, the ratio may be calibrated in terms of velocity. It follows directly that with the dimensions of line 60 known, the ratio can be expressed in units of rate of flow, e.g., gallons per minute. In other words, the decay characteristic of the radioactive material is used for time-determination, thus eliminating the need for an electrical or mechanical timer to measure the time between responses of the two detectors. It will be appreciated that a long-lived isotope is not suitable for this purpose, and that in cases of high velocity flow even Ba–137 may decay too slowly to be conveniently useful; the ruthenium–106—rhodium–106 pair, with a 30-second half-life daughter, may be more desirable.

In keeping with the foregoing, the outputs from ratemeters 63 and 64 are applied to a suitable voltage comparison circuit 65 which indicates the ratio of the intensities measured by detectors 63 and 64. Since there is a time delay between the responses of detectors 61 and 62 (the quantity of interest) it is necessary to store the output from circuit 63 for this period to have it available for comparison with the output from ratemeter 64.

The comparison problem may be simplified by the continuous injection of radioactive material at a constant rate into line 60 at the position indicated. In this case the output of count rate meter 63 will be substantially constant at all times, indicating the average intensity of the activity as it flows by, and likewise detector 62 indicates the average flow rate of the liquid in line 60 without the necessity of signal storage or delay circuits.

While preferred embodiments of the invention have been illustrated and described, it will be apparent that various modifications can be made therein without departing from the spirit thereof, and it is therefore intended that the invention be limited only as such limitation occurs in the appended claims.

What is claimed is:

1. The method of determining the rate of flow of catalyst in a catalytic cracker of the circulating fluid bed type having a predetermined recycling period that comprises storing a long-lived parent radioisotope and a short-lived daughter radioisotope having a half-life which is short relative to said predetermined recycling period in secular equilibrium, periodically separating a discrete amount of the daughter isotope and injecting it into said fluid catalyst at a first point in the catalytic cracker, detecting the peak of emissions from said daughter isotope at a second point in said cracker displaced from said first point in the direction of flow of said catalyst, and measuring the time between the injection of said isotope and the detection of the peak of emissions therefrom at said second point, the activity of said injected isotope decaying sufficiently and being diluted by mixing with the catalyst while circulating through the cracker such that the emissions therefrom are of such low intensity when said discrete amount returns to said second point as not to interfere with the detection of emission peaks of subsequent injections of said short-lived isotope.

2. The method of claim 1 wherein the parent is cesium–137 and the daughter is barium–137.

3. The method of determining the rate of flow of fluid or fluidized solids in a circulating system having a predetermined recycling period which comprises the steps of storing in secular equilibrium a long-lived parent radioisotope and a short-lived daughter radioisotope having a half-life which is short relative to said predetermined recycling period, separating a discrete amount of said daughter isotope and injecting it into said fluid at a first point in said circulating system, detecting the peak of emissions from said daughter isotope at a second point downstream from said first point, and measuring the time between injection of said daughter isotope and the detection of peak emissions therefrom at said second point, the activity of said injected isotope decaying sufficiently while circulating through said system such that emissions therefrom are of such low intensity when said discrete amount returns to said second point as not to interfere with the detection of emission peaks of subsequent injections of short-lived daughter isotope.

References Cited in the file of this patent

UNITED STATES PATENTS

| | | |
|---|---|---|
| 2,631,242 | Metcalf | Mar. 10, 1953 |
| 2,706,254 | Mithoff et al. | Apr. 12, 1955 |
| 2,841,713 | Howard | July 1, 1958 |

OTHER REFERENCES

Radioisotopes in Industry, edited by John R. Bradford, published by Reinhold Pub. Corp., New York, N.Y., copyright 1953, pages 175 to 180 and 264.

Using Tracers in Refinery Control, by E. E. Hull, from Nucleonics, vol. 13, No. 4, published April 12, 1955, pages 18 to 21.